UNITED STATES PATENT OFFICE.

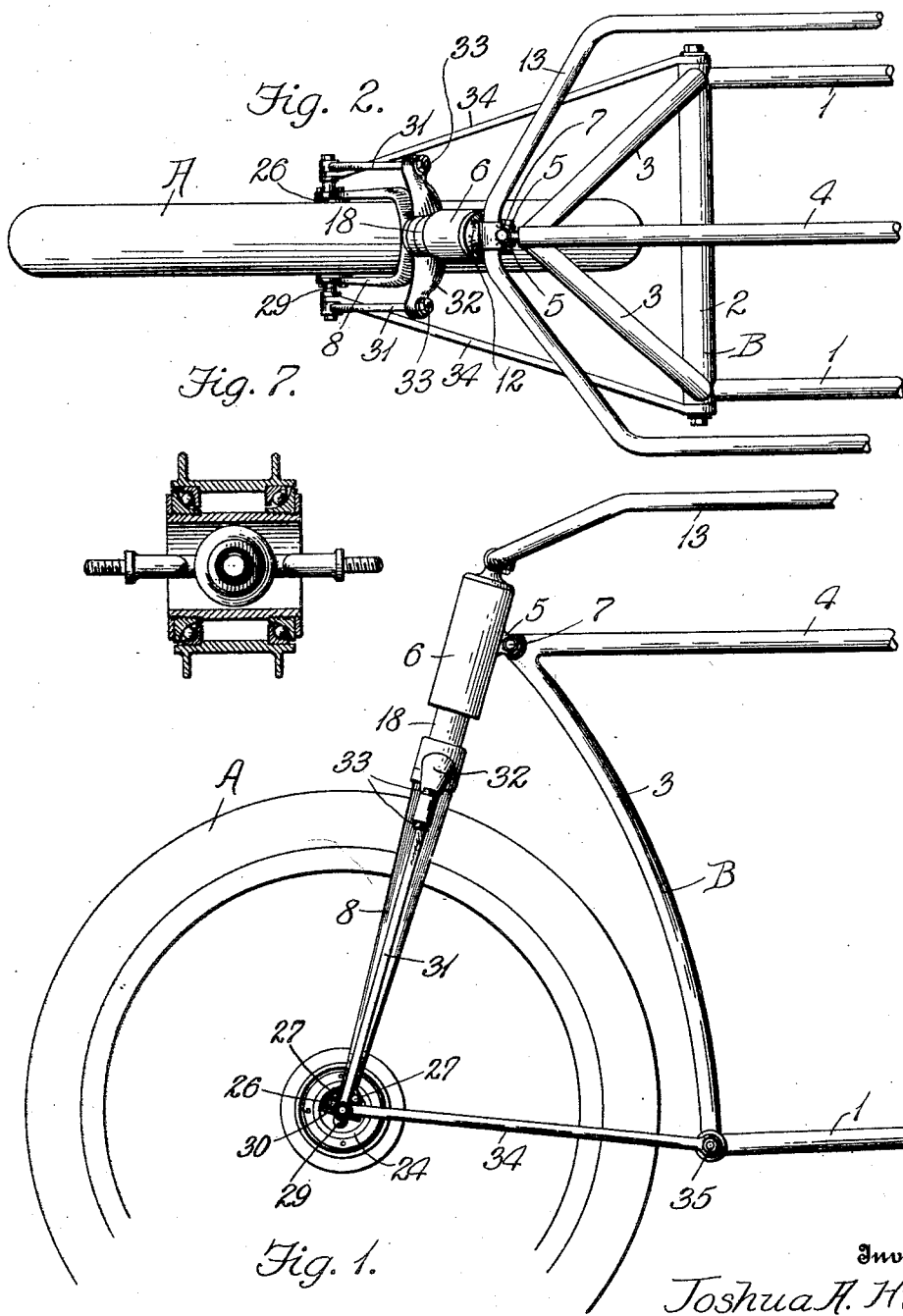

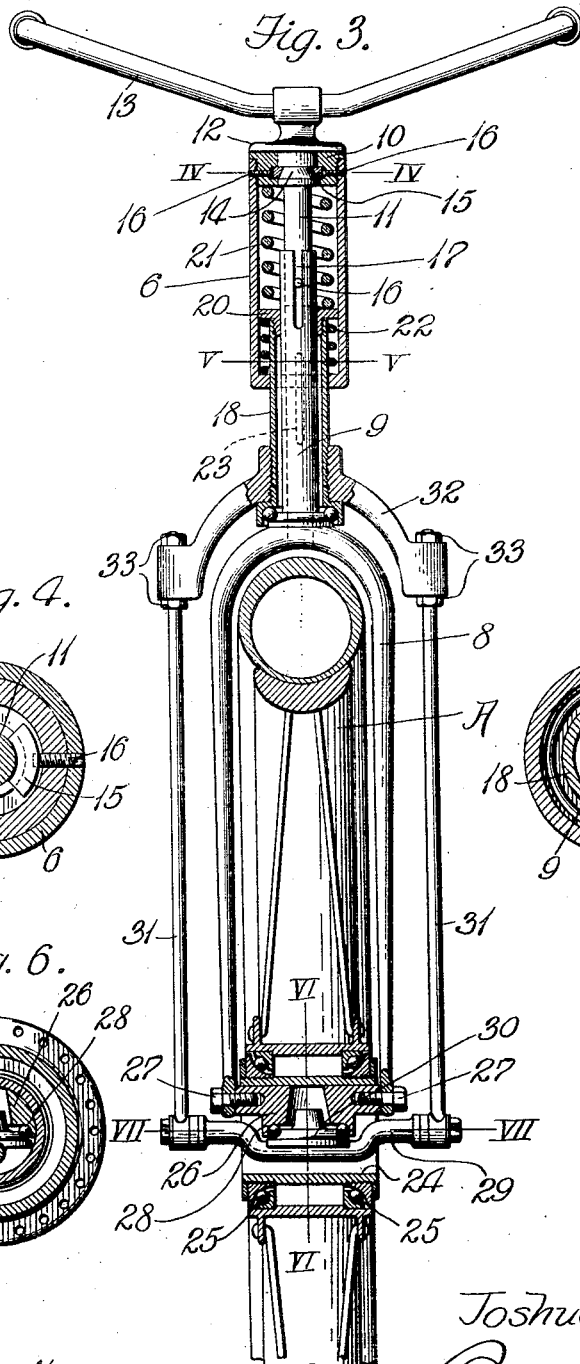

JOSHUA A. HILL, OF ESSEX, ONTARIO, CANADA, ASSIGNOR OF ONE-HALF TO GEORGE W. ROGERS, OF ESSEX, ONTARIO, CANADA.

STEERING-FORK FOR VEHICLES.

1,082,122.  Specification of Letters Patent.  Patented Dec. 23, 1913.

Application filed April 18, 1913. Serial No. 761,914.

*To all whom it may concern:*

Be it known that I, JOSHUA A. HILL, a subject of the King of England, residing at Essex, in the county of Essex and Province of Ontario, Canada, have invented certain new and useful Improvements in Steering-Forks for Vehicles, of which the following is a specification, reference being had therein to the accompanying drawings.

This invention relates to an improved frame for vehicles, and more particularly to a steering head and frame construction for motorcycles, bicycles, and the like, having a front guide wheel.

The object of the invention is to provide a rigid frame and front fork construction which is such that while yieldingly supporting the load, the guide wheel may be turned freely within the frame to guide the vehicle, and which construction, while giving strength and rigidity to the frame, also gives stability and forms a brace against side and end thrusts and strains.

A further object is to provide certain other new and useful features in the construction and arrangement of parts, the invention consisting in the matters hereinafter more fully described and pointed out in the appended claims, reference being had to the accompanying drawings, in which, Figure 1, is a side elevation of the front end portion of a vehicle frame embodying the invention. Fig. 2, is a plan view of the same. Fig. 3, is an enlarged vertical section through the axis of the wheel hub and steering head. Fig. 4, is an enlarged transverse section on the line IV—IV Fig. 3. Fig. 5, is a similar section on the line V—V Fig. 3. Fig. 6, is a transverse section of the hub on the line VI—VI of Fig. 3, and Fig. 7 is a horizontal section of the same on the line VII—VII of Fig. 3.

In the drawings the front end only of the supporting frame of the vehicle is shown, as the invention relates entirely to the manner of attaching the front or wheel A of the vehicle to the supporting frame and the construction of the front fork and steering head for the frame. It is therefore obvious that the supporting frame B which is preferably formed of steel tubing in the usual manner of constructing motor cycle or bicycle frames, may be made in any desired form.

For convenience of illustration, the supporting frame B is shown as being constructed with parallel bottom members 1, connected at their forward ends by a transverse bar 2 and this bar is provided with upwardly extending and converging end members 3 made integral at their lower ends with the ends of the bar 2 and united at their upper ends where they meet and are also united to the forward end of the upper horizontal frame member 4. The members 3 and 4 unite in a suitable eye embraced by rearwardly extending ears 5 on a tubular head 6, which is pivotally connected to the eye of the frame members by means of a pivot bolt 7 passing through the ears and eye. A fork 8 embraces the wheel A and has a tubular stem 9 extending upward into the tubular head 6. A bearing block 10 is screwed into the upper end of the head 6 and forms a bearing for a steering post 11 which is flanged at 12 to rest upon the upper end of the bearing and is provided with the usual socket to receive a handle bar 13 for turning the post. The post is formed with an annular groove 14 where it passes through the block 10 and fitting within a groove in the block to engage said groove in the post are wedge members 15 which are held in firm engagement with the post by means of adjusting screws 16 extending laterally through the head. By turning the screw 16 the wedges 15 may be forced into firm engagement with the groove 14 in the post and thus by such frictional contact prevent the post from turning with too great freedom within the head. The wedges also hold the post firmly within its bearing and may be quickly and easily adjusted at any time to increase or decrease the frictional resistance to the turning of the post. The lower end of the post 11 extends into the upper end of the tubular stem 9 of the fork 8 and a transverse pin 16 carried by the post engages a longitudinal slot 17 extending inward from the upper end of the stem 9. The fork and handle bar are thus connected by the engagement of the pin on the post with the slot in the stem to turn together. A sleeve 18 surrounding the stem 9 is provided with a cup at its lower end to receive balls which rest upon a cone secured to the upper end of the fork 8 at the base of the stem 9. This ball bearing 19 thus formed is interposed between the lower end of the sleeve and the upper end of the fork, and said sleeve has a bearing within the lower end of the tubular head 6 and extends upwardly therein. A bushing 20 having screw threaded engagement with the sleeve 18 within the head 6 forms a guide for the upper end of the sleeve within the head and upon the stem 9, and also forms a seat for a coil spring 21 which is interposed between it and the inner end of the block 10. An auxiliary coil spring 22 is interposed between the lower side of the bushing 20 and the lower end of the tubular head 6. The sleeve 18 is held against turning within the head 6 but is permitted to slide freely therein longitudinally of the head, by means of a rib 23 on the sleeve engaging a notch in the lower end of the head.

As the frame B is attached to the tubular head 6 by means of the pivot 7, the weight of the load upon the frame comes upon the head and is yieldingly supported by the coil spring 21 within the head which is interposed between the upper end of the head and the upper end of the sleeve. Under load, the spring 21 will yield and permit the sleeve 18 and stem 9 to slide into the head 6, the shock of the rebound or recoil of the spring being taken up by the auxiliary spring 22 which acts in opposition to the spring 21 and is of lesser strength.

The wheel A is mounted upon a drum or large tubular axle 24 with the usual ball bearings 25 interposed between the hub of the wheel and said axle. Brazed or otherwise secured within or made a part of the upper side of the tubular axle, is a segmental block 26 to the ends of which the lower ends of the fork arms are secured in any suitable manner as by cap screws 27. This block is formed intermediate its ends in the plane of the axis of the tubular axle, with a ball race 28 and a bearing member 29 extends through the tubular axle and is provided intermediate its ends with a cone 30 to engage balls interposed between it and the race 28. Detachably secured to the laterally extending ends of the bearing member 29 are tension rods 31, each of which has an eye in its lower end to receive one end of the member and is screw threaded at its upper end to extend through an opening in the end of a yoke 32 which is secured upon the sleeve 18 adjacent to the bearing 19. The rods 31 are adjustably secured in the ends of the yoke 32 by means of nuts 33 on the rod above and below the ends of the yoke. The yoke is firmly secured in any suitable manner to the sleeve 18, and as said sleeve is prevented from turning relatively to the head 6, the yoke is also prevented from turning and is held with its ends extending transversely of the frame B.

To brace the ends of the bearing member 29 and hold the same in a fixed position relative to the frame B, brace rods 34 are pivotally attached to the ends of the bearing member by being provided with eyes to receive said ends, and the opposite ends of the rods are pivotally attached at 35 in any suitable manner to the ends of the cross member 2 of the frame. The brace rods 34 thus form struts between the frame and the ends of bearing member and as said member is held in engagement with the tubular axle 24 by means of the ball bearing, the lower ends of the fork arms are relieved from any thrust which comes upon the wheel tending to force it toward the frame, such thrust being taken directly by the rods 34. In this construction the tubular head, sleeve 18, yoke 32, tension rods 31, bearing member 29 and thrust rods 34 form a supporting frame work for the wheel, within which said wheel turns freely upon the ball bearings 19 and 30. To provide for the necessary spring suspension of the front wheel which will allow it to rise independently of the frame when passing over an obstruction in the road, the head 6 is pivotally attached to the frame at 7 and the rods 34 are pivotally attached at one end to the frame and at their opposite ends to the bearing member which forms a center upon which the wheel pivots in turning laterally to guide the vehicle.

The fork is held seated and any lost motion is taken up by adjusting the tension rods 31 and when it is desired to remove the wheel or fork, it is only necessary to detach said rods from their yoke 32 or from the ends of the member 29 and, dropping said member down into the lower part of the tubular axle, remove said member endwise. The stem of the fork may then be slipped out of the head. The thrust rods 34 diverge rearwardly from the forks to the frame and thus firmly brace said forks against any thrust coming upon the wheel. A very rigid construction is thus secured and a broad base is provided for the frame upon which a motor (not shown) may be supported and the center of gravity of the vehicle brought low down.

Having thus fully described my invention, what I claim is:

1. In a vehicle, the combination of a frame, a wheel, a fork embracing the wheel, means for turning the fork, a tubular axle for the wheel to which the fork is secured, a bearing member extending through the tubular axle, and thrust members attached to the ends of said member and extending rearwardly to the frame.

2. In a vehicle, the combination of a frame, a wheel, a fork embracing the wheel, means for turning the fork to change the direction of travel of the wheel, thrust members connected to the frame and converging forwardly therefrom at each side of the wheel, and a bearing member connecting the forward ends of the thrust members and extending through the wheel at the axis thereof permitting a laterally turning movement of the wheel between said members.

3. In a vehicle, the combination of a frame, a wheel, a fork embracing the wheel, a tubular axle for the wheel to which the fork is attached, thrust members extending forwardly from the frame at the sides of the wheel, and a bearing member connecting the forward ends of said thrust members and extending through said axle in engagement therewith intermediate its ends to permit the wheel to turn upon an upwardly extending axis.

4. In a vehicle, the combination of a frame, a wheel, a tubular axle upon which the wheel turns, a fork embracing the wheel and attached to the tubular axle, a bearing member extending through the tubular axle, upon which said axle is adapted to turn about an upwardly extending axis, and members connecting the ends of said bearing member and the frame.

5. In a vehicle, the combination of a frame, a wheel, a hollow axle upon which the wheel turns, a fork embracing the wheel and attached to the ends of the axle, a bearing member extending through the axle and having a bearing intermediate its ends upon which the axle is adapted to turn upon an upwardly extending axis, and members at each side of the wheel connected to the ends of the bearing member and to the frame.

6. In a vehicle, the combination of a frame, a wheel, a hollow axle for the wheel, a fork embracing the wheel and attached to the axle, a member extending through the axle, means connecting the ends of the member with the frame, a head on the frame within which the fork is adapted to turn, and means connecting the ends of the member which extends through the axle with said head.

7. In a vehicle, the combination of a frame, a wheel, a hollow axle for the wheel, a fork embracing the wheel and attached to the ends of the axle, a head on the frame within which the fork is adapted to turn, a bearing member extending through the axle and provided with a bearing intermediate its ends upon which the axle is adapted to turn upon an upwardly extending axis, a thrust member at each side of the wheel attached to the frame at one end and to the bearing member at its opposite end, and means connecting the ends of the bearing member and the head.

8. In a vehicle, the combination of a frame, a wheel, a head pivotally attached to the frame, a fork embracing the wheel and slidingly engaging the head, means for yieldingly supporting the head upon the fork, thrust members pivotally attached at one end to the frame, and means pivotally connecting the opposite ends of said members to the wheel at its axis and adapted to permit said wheel to turn upon an upwardly extending axis.

9. In a vehicle, the combination of a frame, a wheel, a hollow axle for the wheel, a fork embracing the wheel and attached to the axle, a head pivotally attached to the frame, a spring interposed between the head and fork, a bearing member extending through the hollow axle and pivotally connected thereto, and thrust members attached to the ends of said bearing member at one end and pivotally attached at the opposite end to the frame.

10. In a vehicle, the combination of a frame, a wheel, a hollow axle for the wheel, a fork embracing the wheel and attached to the axle, a yoke carried by the frame and resting upon the fork to turn thereon, a bearing member extending through the axle engaging said axle intermediate its ends, means adjustably connecting the ends of the bearing member and said yoke and thrust members connected to the ends of the bearing member and to the frame at the sides of the wheel.

11. In a vehicle, the combination of a frame, a wheel, a hollow axle upon which the wheel turns, a fork embracing the wheel attached to the axle, a bearing member extending through the axle upon which the axle is adapted to turn upon an upwardly extending axis, a yoke carried by the frame within which yoke the fork is adapted to turn, means adjustably connecting the ends of the yoke to the ends of the bearing member, and thrust members attached at one end to the ends of the bearing member and at their opposite ends to the frame.

12. In a vehicle, the combination of a wheel, a hollow axle, a bearing member extending through the axle, a bearing carried by the bearing member and engaging the axle which is adapted to turn thereon upon an upwardly extending axis, a head on the frame, a fork embracing the wheel and attached to the axle, a stem on the fork adapted to turn within the head, means engaging the stem for turning the fork, a yoke connected to the head, a bearing interposed between the yoke and the fork, means for adjustably connecting the ends of the bearing member and the ends of the yoke, and thrust members connecting the frame and the ends of the bearing member.

13. In a vehicle, the combination of a frame, a wheel, a hollow axle for the wheel, a bearing member extending through the axle, a bearing on the bearing member upon which the axle is adapted to turn upon an upwardly extending axis, thrust members pivotally attached to the ends of the bearing member and to the frame, a tubular head pivotally attached to the frame, a fork embracing the wheel and secured to the ends of the axle, a stem on the fork projecting into the head, a spring interposed between the head and the stem, a bearing on the fork to support the head, and means connecting the bearing member to the head.

14. In a vehicle, the combination of a frame, a wheel, a hollow axle, a bearing member extending through the axle, a bearing on said member upon which the axle is adapted to turn on an upwardly extending axis, a fork embracing the wheel secured to the axle, thrust members pivotally attached to the ends of the bearing member and to the frame, a tubular head pivotally attached to the frame, a stem on the fork extending into the head, a sleeve on the stem extending into the head, a spring interposed between the end of the sleeve and the head, a bearing interposed between the lower end of the sleeve and the fork, a yoke secured to the sleeve, and tension rods connecting the ends of the bearing member to the ends of the yoke.

15. In a vehicle, the combination of a frame, a wheel, a tubular axle upon which the wheel turns, a bearing member extending through the tubular axle, a bearing on the bearing member upon which the axle is adapted to turn upon an upwardly extending axis, thrust rods pivotally attached to the ends of the bearing member at their forward ends and pivotally attached at their rear ends to the frame, a fork embracing the wheel and secured to the ends of the axle, a tubular head pivotally attached at one side intermediate its ends to the frame, a stem on the fork extending into the head, a steering post in the head having sliding engagement with the stem and connected thereto to turn therewith, a sleeve on the stem, a bearing interposed between the lower end of the sleeve and the fork, a bushing in the head upon the upper end of the sleeve, a spring interposed between the bushing and the upper end of the head, a second spring interposed between the bushing and the lower end of the head, a yoke secured to the sleeve, and tension rods attached to the ends of the bearing member and adjustably secured to the ends of the yoke.

In testimony whereof I affix my signature in presence of two witnesses.

JOSHUA A. HILL.

Witnesses:
  ANNA M. DORR,
  C. R. STICKNEY.